United States Patent [19]

Itoh

[11] 4,266,244

[45] May 5, 1981

[54] SYSTEM FOR DETECTING THE INITIAL POINT OF A DIGITAL SIGNAL IN A COMPOSITE DIGITAL SIGNAL REPRODUCING SYSTEM

[75] Inventor: Yasuo Itoh, Tokyo, Japan

[73] Assignee: Victor Company of Japan Ltd., Yokohama, Japan

[21] Appl. No.: 77,490

[22] Filed: Sep. 20, 1979

[30] Foreign Application Priority Data

Sep. 22, 1978 [JP] Japan .................................. 53/117270

[51] Int. Cl.³ ............................................... H04N 7/00
[52] U.S. Cl. ..................................... 358/142; 358/147
[58] Field of Search ............... 358/141, 142, 143, 145, 358/146, 147, 148

[56] References Cited

U.S. PATENT DOCUMENTS

4,122,477  10/1978  Gallo ................................ 358/141 X

Primary Examiner—Robert L. Richardson
Attorney, Agent, or Firm—Haseltine and Lake

[57] ABSTRACT

A system for detecting the initial point of a digital signal is used in a system for reproducing a composite digital signal which is composed of a composite synchronizing signal having horizontal synchronizing signals, vertical synchronizing signals and equalizing pulses, and a digital signal interposed between the composite synchronizing signals. The detection system has a circuit for forming a signal of horizontal scanning period responsive to the composite synchronizing signal separated from the composite digital signal, a circuit for frequency dividing the horizontal scanning period signal located immediately after the vertical synchronizing signal in the composite synchronizing signal, and a circuit for forming, responsive to the output signal of the frequency dividing circuit, a signal corresponding to the initial point of the digital signal following the equalizing pulse in the composite digital signal.

6 Claims, 7 Drawing Figures

SYSTEM FOR DETECTING THE INITIAL POINT OF A DIGITAL SIGNAL IN A COMPOSITE DIGITAL SIGNAL REPRODUCING SYSTEM

BACKGROUND OF THE INVENTION

The present invention relates generally to a system for detecting the initial point of a digital signal in a composite digital signal reproducing system, and more particularly to a system for detecting the initial point of a digital signal which is formed from an information signal such as an audio signal and exists during a period corresponding to the video signal period between adjacent composite synchronizing signals of a composite video signal.

Known recording and reproducing apparatuses for audio signals which record and reproduce analog audio signals, as they are, on and from a traveling magnetic tape by means of a fixed head, have experienced such problems as wow and flutter of the tape travel, noise, distortion, etc., due to the tape and head systems. As a consequence, these problems have constituted a barrier limiting efforts to improve the quality of recording and reproducing of audio signals.

Accordingly, a method wherein an analog audio signal is rendered into a digital signal by using a method such as pulse code modulation (PCM) has been developed and put into practice. By this method, the S/N ratio is greatly improved, and the effects of problems such as distortion due to nonlinearity of the recording medium are greatly reduced.

This recording and reproducing of a digital signal requires a recording and reproducing system of wider band or of a greater number of channels than a recording and reproducing system for an analog method of carrying out recording and reproducing of a digital signal using a video tape recorder (VTR) of the type widely used for recording and/or reproducing composite audio signals, and easily available on the market, has been developed and reduced to practice. In this specification, the term "composite video signal" is used to mean a signal composed of an information video signal and synchronizing signals such as vertical synchronizing signals, equalizing pulses, and horizontal synchronizing signals. A VTR of this type is capable of recording/reproducing video signals in a wide band with a track oblique to the traveling magnetic tape by means of rotary heads which scan with a relatively high scanning speed.

To record an audio signal with a VTR, the analog audio signal to be recorded is converted into a digital signal in an adapter device connected to the VTR, and this digital signal is interposed between synchronizing signals of the same kind as those of an ordinary composite video signal. The composite digital signal thus obtained is fed to the VTR and recorded on the magnetic tape by the rotary heads. At the time of reproducing, the signal reproduced from the magnetic tape by the rotary heads in the VTR is fed to the adapter device, where the synchronizing signals are removed therefrom, and the digital signal is converted into an analog signal and thus restored to the original audio signal.

In general, upon interposing the above-described digital signal between the synchronizing signals, in order to assure that the reproduced demodulated signal does not suffer any deficiency even when signal drop-out has occured, the words obtained by each sample are arranged into a combination of words wherein each of serial words is apart from each other by ten-several H (H denotes the unit horizontal synchronizing period) to interleave with each other. Here, a "unit word" refers to the combination of bits obtained from a single sample. The period of time represented by ten-several H is determined in conformance with the format. In the reproducing system, writing-in and reading-out operation in and from a memory are carried out to rearrange the words which have been interleaved and changed in order are restored to the original order, whereby reproduction is accomplished.

VTRs for recording and reproducing digital signals are adapted to record and reproduce video signals composed of odd fields and even fields. Accordingly, a field-unit signal in which the digital signal is interposed between the composite synchronizing signals is similarly composed of an odd field and an even field, which differ by 0.5 H from each other.

In this connection, it is required to accurately detect the initial point of the digital signal for each field at the time of rearranging the words in the reproduction system.

Until the present time, in order to accurately detect the initial point of the digital signal, an identification signal for indicating the initial point of the digital signal has been interposed immediately after the vertical synchronizing signal. This identification signal is detected in the reproduction system, and in this way the beginning of the digital signal is known.

This known system, however, entails a difficulty in that employment of an identification signal decreases the time available for the digital signal by the period of the identification signal and this degrades the signal transmission efficiency. Furthermore, the use of an identification signal is troublesome in that it must be a special and easily distinguishable signal so as to prevent erroneous detection. Furthermore, the identification signal has to be standardized among manufactures so as to assure interchangeability.

SUMMARY OF THE INVENTION

Accordingly, it is a general object of the present invention to provide a novel and useful system for detecting the initial point of a digital signal in a composite digital signal reproducing system in which the above-described difficulties have been overcome.

Another and specific object of the present invention is to provide a system, in a reproducing system for reproducing a composite digital signal, in which a digital signal is interposed in place of a video signal in the video signal period of a composite video signal having synchronizing signals, for detecting with certainty the position from which the digital signal starts after the vertical synchronizing signal in the reproduced signal. According to the system of the present invention, since detection of the point where the digital signal starts is carried out by using the synchronizing signal, no special identification is required for the above detection. Consequently, the efficiency of transmitting digital information signals is improved, and no troublesome procedure for standardization among manufacturers arises.

Other objects and features of the present invention will become apparent form the following detailed description when read in conjunction with the accompanying drawings.

DETAILED DESCRIPTION OF THE INVENTION

A general description is first given of a composite digital signal reproducing system to which a system for detecting the initial point of a digital signal according to the present invention has been applied.

Figure 1:
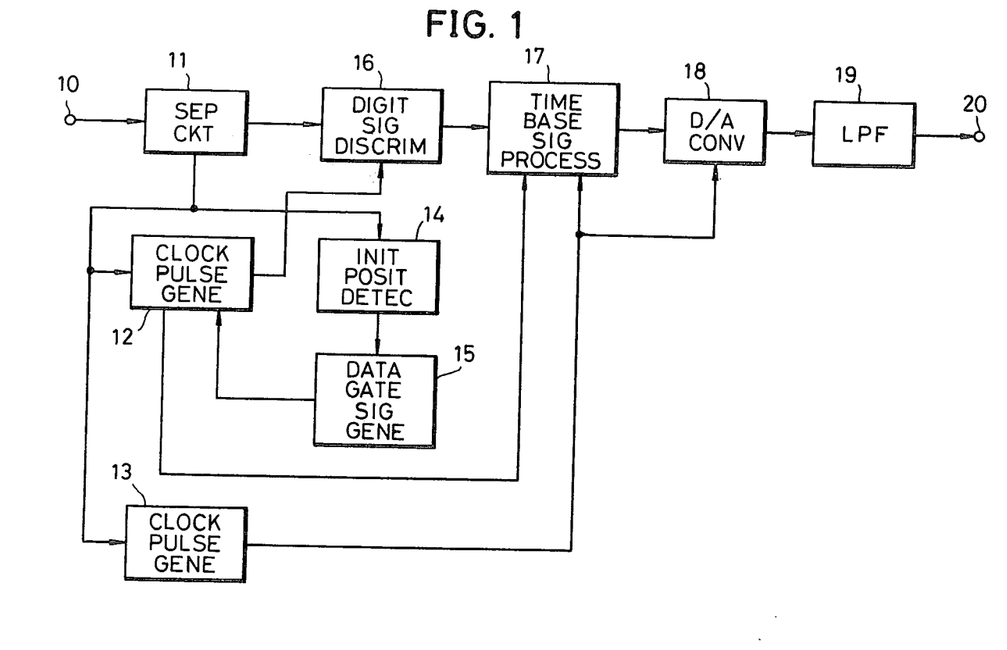
FIG. 1 is a schematic block diagram of a digital signal reproduction system to which one embodiment of a system for detecting the initial point of a digital signal according to the present invention has been applied.
Figure 4:
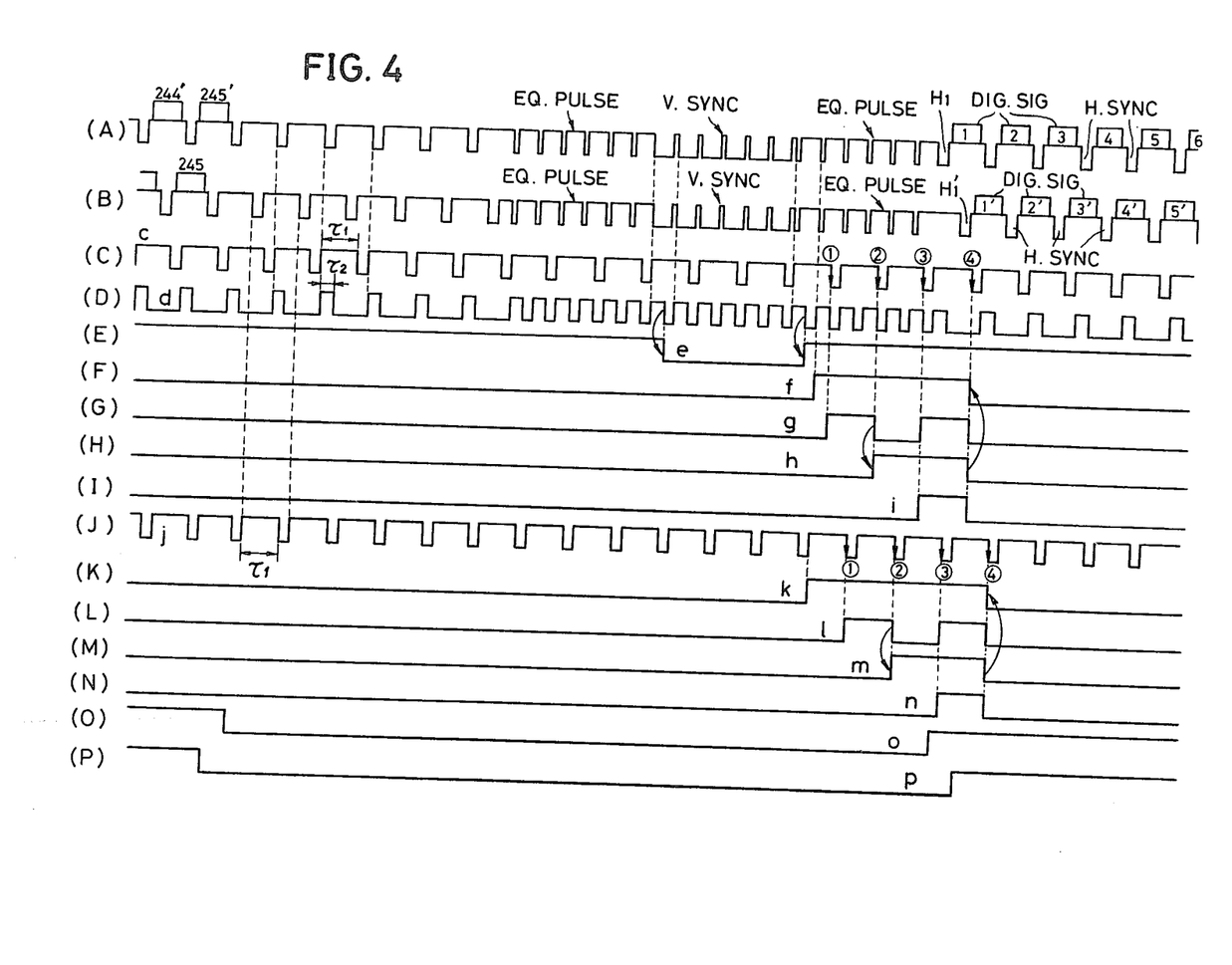
FIG. 4(A) through FIG. 4(P) are waveforms of signals at various parts in block diagrams in FIGS. 2 and 3.

Referring to FIG. 1, a composite digital signal which has been reproduced from a magnetic tape (not shown) is introduced through an input terminal 10 and is supplied to a separation circuit 11. FIGS. 4(A) and 4(B) show the composite digital signal, which is composed of vertical synchronizing signal V.SYNC, equalizing pulses EQ. PULSE present before and after the vertical synchronizing signal as in a composite video signal, and further modulated digital signal DIG. SIG. The time period of this digital signal exists during a period (designated by reference numerals 1–245 of 1'–245') corresponding to the video signal period (the period between horizontal synchronizing signals H. SYNC interposed between the vertical synchronizing signals of each field) in a composite video signal.

The modulated digital signal DIG. SIG. is a modulated signal in which an information signal, such as an audio signal, has been subjected to digital signal processing by means of a modulation system such as pulse coded modulation (PCM). In this digital signal, the information signal which is present continuously has been time compressed so as not to be present in the above described synchronizing signal period. The words obtained by each sample are arranged into a combination of words wherein each of serial words is apart from each other by ten-several H to interleave with each other in conformity with the format.

The composite digital signal in which the modulated digital signal and the composite synchronizing signal have been combined is recorded on and reproduced from a magnetic tape in oblique tracks by the rotary heads of a VTR. The resulting reproduced composite digital signal is applied to the input terminal 10.

The reproduced composite digital signal is separated into a composite synchronizing signal comprising vertical synchronizing signals, equalizing pulses, and horizontal synchronizing signals, and a modulated digital signal. The composite synchronizing signal thus separated is supplied to clock pulse generators 12 and 13, and to a circuit 14 for detecting the initial point of the digital signal. The detection circuit 14 produces a signal for detecting the initial point of the digital signal through the use of a synchronizing signal, as discussed further below, and supplies the signal thus produced to a data gate signal generation circuit 15. The generation circuit 15 generates a data gate signal as described later, which signal is supplied to the clock pulse generator 12.

On the other hand, the modulated digital signal thus separated is supplied to a digital signal discrimination circuit 16, where it is discriminated (reproduced) as 1 or 0, and is then supplied to a time base signal processing circuit 17.

The signal processing circuit 17 is supplied with clock pulses for writing-in (for memory access) from the clock pulse generator 12 thereby to carry out writing-in, and is supplied with clock pulses for reading-out from the clock pulse generator 13 thereby, to carry out reading-out. In the signal processing circuit 17, the modulated digital signal is subjected to time base expansion by an amount corresponding to the time base compression, which has been carried out in the recording system so that digital signals are precluded from the synchronizing signal part, thereby to be restored to a continuous digital signal. Any words which have been arranged to be interleaved in accordance with the format are restored, and further, any jitter components which have developed upon recording on and reproduction from the magnetic tape are eliminated.

The output signal of the signal processing circuit 17 is supplied to a converter 18, where it is D/A converted responsive to pulse signals from the clock pulse generator 13 and is thereby restored to the original audio signal. The resulting audio signal passes through a low-pass filter 19, and leaves through an output terminal 20.

Here, the timing of writing-in in the signal processing circuit 17 is determined by the writing-in clock pulse from the clock pulse generator 12. Accordingly, if the timing of the beginning of the writing-in clock pulses does not coincide exactly with the timing of the initial point of the modulated digital signal among the composite digital signal of each field, rearranging of the interleaved words to restore them to the original words in the reproducing system will not correspond to arranging of words to interleave them in the recording system, whereby it will be impossible to obtain the original audio signal. Therefore, it is essential for the above-described timings to coincide with each other exactly.

A description will now be given with reference to a block system in complete form of one embodiment of the detection circuit 14 for detecting the beginning of a digital signal and the data gate signal generation circuit 15. These two circuits constitute essential parts of the system of the present invention, and are adapted to detect the beginning of the digital signal without using any such special identification signal as is used in the known system, and to control the clock pulse generator 12.

Figure 2:
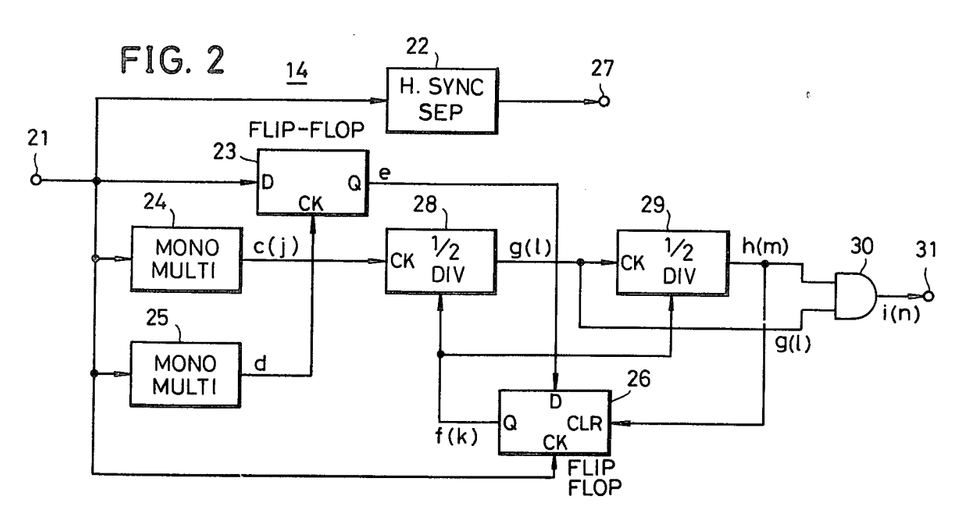
FIG. 2 and FIG. 3 are more detailed block diagrams showing essential parts of the block diagram in FIG. 1.

FIG. 2 shows the detection circuit 14 in concrete form. The synchronizing signal separated by the separation circuit 11 is applied to an input terminal 21. The composite synchronizing signal is respectively applied to a horizontal synchronizing signal separation circuit 22, a data terminal D of a D-type flip-flop 23, monostable multivibrators 24 and 25, and a clock pulse input terminal CK of a D-type flip-flop 26. A horizontal synchronizing signal is separated in the horizontal synchronizing signal separation circuit 22 and is then fed out from an output terminal 27.

The composite video signal recorded and reproduced by the VTR is composed of odd fields and even fields for naturally achieving interlacing, as described above. In this connection, the composite digital signal in which the digital signals are inserted in place of the video information signals of the composite video signal, is also composed of odd fields and even fields, as illustrated in FIGS. 4(A) and 4(B). In FIG. 4(A), the right hand side with respect to the equalizing pulse EQ. PULSE is an odd field, and in FIG. 4(B), the right hand side with respect to the equalizing pulse EQ. PULSE is an even field. As well known, with odd fields and even fields, the time interval from the vertical synchronizing signal V. SYNC to the initial point of the digital signal DIG. SIG. differs by 0.5 H.

The monostable multivibrator 24 is triggered by an edge (falling-down negative-going edge, in this case) of the composite synchronizing signal extending from the pedestal level thereof to the tip level (referred to as "sinc tip" hereinafter) of the synchronizing signal, thus generating pulses of a pulse width $\tau_1$. The pulse width $\tau_1$ is selected to satisfy the relationship $0.5\,H < \tau_1 < H$, so that the monostable multivibrator 24 does not respond to any of the equalizing pulses existing at 0.5 H intervals, but responds to the equalizing pulses of H interval. This output pulse becomes as shown by waveform c in FIG. 4(C) when generated in correspondence with the composite synchronizing signal in FIG. 4(A), and alternatively assumes the form shown by waveform j in FIG. 4(J) when generated responsive to the composite synchronizing signal in FIG. 4(B).

The other monostable multivibrator 25 is triggered by the above-described falling-down part of the composite synchronizing signal, thus generating a pulse having a pulse width $\tau_2$. This pulse width $\tau_2$ is selected to satisfy the relationship $\tau_2 < 0.5\,H$, so that the monostable multivibrator 25 responds to all the equalizing pulses as well as the horizontal synchronizing signal and the vertical synchronizing signal.

The flip-flop 23 operates to discriminate whether the composite synchronizing signal applied to the terminal D is high level or low level at the falling-down position of the pulse d applied to the terminal CK thereof. Accordingly, the flip-flop 23 generates as output, a signal e, responsive to the composite synchronizing signal in FIG. 4(A). This signal assumes a low level during a period substantially corresponding to the vertical synchronizing signal V. SYNC, as indicated in FIG. 4(E). The signal e thus generated is applied to the data input terminal D of the flip-flop 26.

The flip-flop 26 is set at a falling-down part of the composite synchronizing signal applied to the clock pulse input terminal CK. In connection with this, the flip-flop 26 produces a signal f shown in FIG. 4(F) as an output from its terminal Q. The signal f falls down responsive to the falling-down edge of the equalizing pulse introduced into the terminal CK. This falling-down edge is present immediately after the rising edge of the signal e corresponding to the vertical synchronizing signal applied to the terminal D of the flip-flop 26. The output signal f is supplied to ½ frequency dividing circuits 28 and 29 comprising counters. During the period when the signal f is at its high level, the ½ frequency dividing circuits 28 and 29 are released from their reset state, so as to be put into their count-enable state.

These ½ frequency dividing circuits 28 and 29 are connected in cascade. The ½ frequency dividing circuit 28 which has been rendered to be count-enable by the signal f performs rising-up and falling-down repeatedly in synchronism with the falling-down of the input pulse c, and halves the pulse c to produce as output a signal g indicated in FIG. 4(G). The signal g is then fed to the ½ frequency dividing circuit 29, where its frequency is halved in synchronism with the falling-down of the pulse g. From the ½ frequency dividing circuit 29, there is obtained a signal h (FIG. 4(H)) which is frequency divided by ¼ in comparison with the pulse c.

The signal h is applied to the clear terminal CLR of the flip-flop 26 and causes the flip-flop 26 to be cleared (reset) responsive to the falling-down of the signal h. As a result, the output signal f is changed from its high level to its low level, thus resetting the ½ frequency dividing circuits 28 and 29. The ½ frequency dividing circuits 28 and 29 are thus inhibited from counting.

The output signal h of the ½ frequency dividing circuit 29 is applied, together with the output signal g of the ½ frequency dividing circuit 28, to an AND circuit 30. The AND circuit 30 produces as output a signal i shown in FIG. 4(I), which is fed out through an output terminal 31.

The description set forth above relates to the case where the input signal to the input terminal 21 is the composite synchronizing signal shown in FIG. 4(A), but the result is the same also for the composite synchronizing signal shown in FIG. 4(B). Specifically, in this case, there are obtained a pulse j (FIG. 4(J)) from the monostable multivibrator 24, an output signal k (FIG. 4(K)) from the flip-flop 26, a signal l (FIG. 4(L)) from the ½ frequency dividing circuit 28, and a signal m (FIG. 4(M)) from the ½ frequency dividing circuit 29. Accordingly, the AND circuit 30 produces a signal n (FIG. 4(N)).

The signals i and n correspond respectively to first horizontal synchronizing pulses $H_1$ and $H_1'$ after the equalizing pulse EQ. PULSE in the composite digital signal indicated in FIGS. 4(A) and 4(B); that is, they correspond to the leading horizontal synchronizing pulses with respect to the digital signal DIG. SIG.

Figure 3:
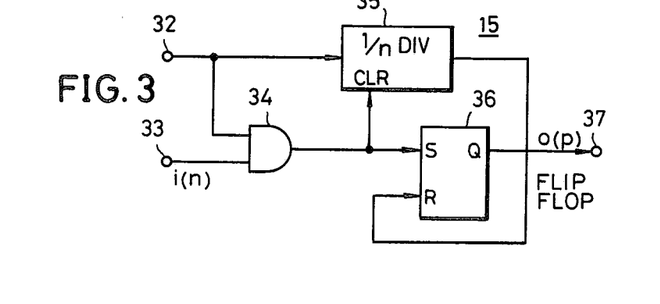

The horizontal synchronizing signal and the signal i (n) of the output terminals 27 and 31 of the detection circuit 14 indicated in FIG. 2 are respectively applied to input terminals 32 and 33 of a data gate signal generation circuit 15 indicated in FIG. 3. The horizontal synchronizing signal introduced through the terminal 32 is supplied to an AND circuit 34 and to a 1/n (1/245, in this case) frequency dividing circuit 35. The signal i (n) introduced through the terminal 33 is supplied to the AND circuit 34. From the AND circuit 34, there is produced the above-described horizontal synchronizing pulses $H_1$ and $H_1'$ which correspond to the periods of the signals i and n.

The output pulse of the AND circuit 34 is applied to a clear terminal CLR of the 1/n frequency dividing circuit 35, thus causing it to be cleared at the rising-up edge thereof. Simultaneously, the output pulse of the AND circuit 34 is also supplied to a set terminal S of an R-S flip-flop 36, thus setting it at the rising-up edge thereof. Therefore, when the signal i and the pulse $H_1$ are applied to the AND circuit 34, there is produced from a Q terminal of the flip-flop 36 a signal o which rises in coincidence with the rising-up of the pulse $H_1$, as indicated on the right-hand side in FIG. 4(O). The flip-flop 36 is reset, whereupon the pulse which has been subjected to 1/n frequency division in the 1/n frequency dividing circuit 35 is applied to a reset terminal R thereof, whereby the output signal o falls down as indicated on the left-hand side in FIG. 4(O).

Similarly, when the signal n and the pulse H' are applied to the AND circuit 34, the flip-flop circuit 36 produces an output signal p indicated in FIG. 4(P).

The rising (leading) edges of these output signals o and p are respectively synchronized at all times with the rising (leading) edges of the first horizontal synchronizing pulses H and H' following the equalizing pulse EQ. PULSE in the composite digital signal; that is, they are synchronized with the leading horizontal synchronizing pulse with respect to the digital signal DIG. SIG.

The output signals o and p are passed from an output terminal 37 and supplied to the clock pulse generator 12. This clock pulse generator 12 is of a known circuit arrangement and is adapted to generate a specific clock pulse based on the composite synchronizing signal from the separation circuit 11 and the output signals o and p from the generation circuit 15.

Figure 5:
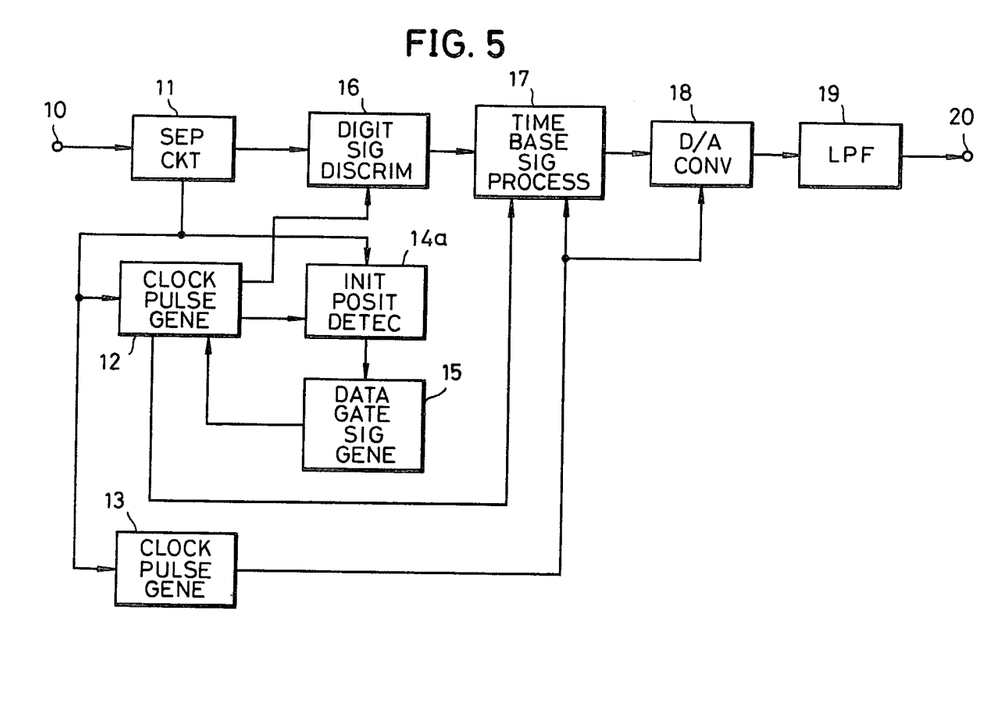
FIG. 5 is a schematic block diagram, similar to FIG. 1, to which another embodiment of the detection system of the present invention has been applied.
Figure 6:
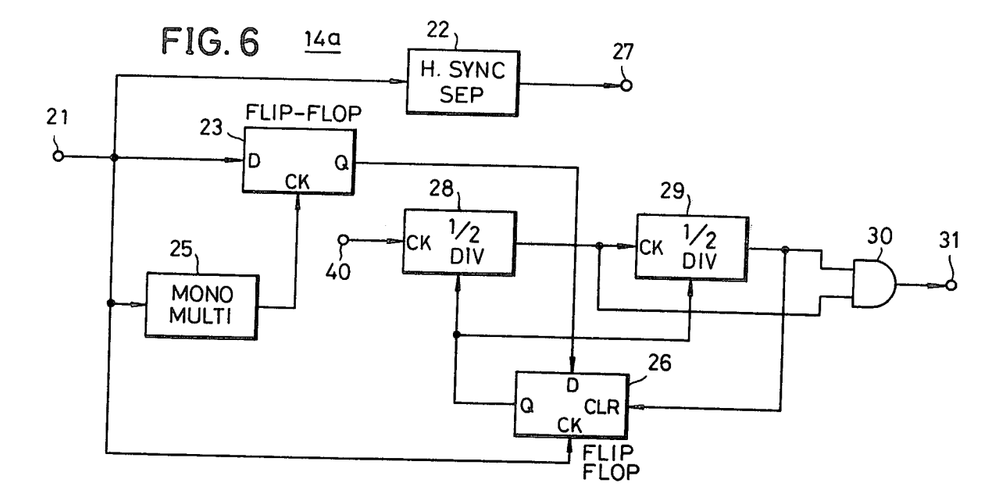
FIG. 6 is a more detailed block diagram showing an essential part of the block diagram in FIG. 5.
Figure 7:
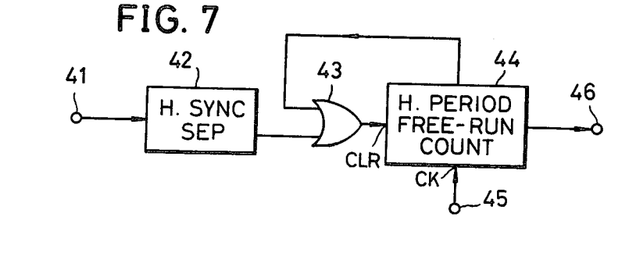
FIG. 7 is a more detailed block diagram showing another part of block diagram in FIG. 5.

Next, a description is given of a second embodiment of a system of the present invention with reference to FIG. 5 through FIG. 7. Parts in FIG. 5 and FIG. 6 which are the same as corresponding parts in FIG. 1 and FIG. 2 are designated by like reference numerals. Detailed description of such parts will not be repeated.

Referring to FIG. 5, a detection circuit 14a corresponding to the detection circuit 14 in FIG. 2 has the circuit arrangement illustrated by the block diagram in FIG. 6. Differently from the detection circuit 14 in FIG. 2, the detection circuit 14a indicated in FIG. 6 is not provided with the monostable multivibrator 24. To the clock terminal CK of the ½ frequency dividing circuit 28, is applied a signal which is introduced from the clock pulse generator 12 through an input terminal 40.

The clock pulse generator 12 of well-known arrangement inherently includes, at a part thereof, a circuit as indicated in FIG. 7. The composite synchronizing signal which has been applied to a terminal 41 from the separation circuit 11 is fed to a horizontal synchronizing signal separation circuit 42, where the horizontal synchronizing signals are separated. A horizontal scanning period free-running counter 44 counts the data strobe pulses applied through a terminal 45 at its clock terminal CK. These pulses are formed at other circuit parts in the clock pulse generation circuit 12. The output signal of the counter 44 is supplied, together with the output of the horizontal synchronizing signal separation circuit 42, to an OR circuit 43. The output of the OR circuit 43 is applied to a clear terminal CLR of the counter 44. The counter 44 performs free-running counting operation and produces, as output, a train of pulses of H period, even during a period when horizontal synchronizing signal from the horizontal synchronizing signal separation circuit 43 is nonexistent, that is, in the vertical synchronizing signal period, for example.

From a specific terminal of the counter 44, a decoded pulse is obtained having a phase corresponding to the time constant $\tau_1$ in the above-described embodiment. This decoded pulse is applied through an output terminal 46 to the terminal 40 of the detection circuit 14a.

According to the present embodiment, it is not necessary to provide the monostable multivibrator 24 required in the embodiment described above. Therefore, a simplified circuit arrangement is attained.

This invention is not limited to these embodiments but various variations and modifications may be made without departing from the scope of the invention.

What is claimed is:

1. A system for detecting the initial point of a digital signal in a composite digital signal reproducing system, said composite digital signal comprising a composite synchronizing signal having horizontal synchronizing signals, vertical synchronizing signals and equalizing pulses which are the same as the composite synchronizing signal of a composite video signal composed of odd fields and even fields, and a digital signal having information interposed between said composite synchronizing signals, said reproducing system having means for separating said composite digital signal into said composite synchronizing signal and said digital signal, means for writing-in and reading-out the digital signal thus separated to carry out processing of said digital signal on a time base, and clock pulse generation means for supplying writing-in and reading-out clock pulses to said signal processing means, said detecting system comprising: means for generating a first train of pulses having pulse width $\tau_1$ defined by $0.5H < \tau_1 < 1H$, where H denotes a horizontal scanning period, and responsive to said composite synchronizing signal separated by said separation means; means for generating a second train of pulses having pulse width $\tau_2$ defined by $\tau_2 < 0.5H$ and responsive to said composite synchronizing signal separated by said separation means; means supplied with said second pulses train generated from said second pulse train generation means and said composite synchronizing signal separated by said separation means, for producing as output a signal corresponding to the vertical synchronizing signal in said composite synchronizing signal; means for receiving said first pulse train and for frequency dividing said first pulse train thus received; means, supplied with said composite synchronizing signal thus separated and the signal corresponding to said vertical synchronizing signal, for producing as as output a signal which rises responsive to an initial equalizing pulse following the pulse corresponding to said vertical synchronizing signal and conversely falls whereupon it is supplied with the output of said frequency dividing means, and for supplying said output signal to said frequency dividing means for enabling it to perform frequency dividing operation; and means for producing as output, responsive to the output signal of said frequency dividing means and the horizontal synchronizing signal in said composite synchronizing signal, a control signal in responsive correspondence with the initial point of the digital signal in said composite digital signal, and for supplying the resulting output signal to said clock pulse generation means.

2. A detection means as claimed in claim 1 wherein said control signal producing means comprises:
means for producing as output a detection signal from the output signal of said frequency dividing means, said detection signal having a width covering the initial point of said digital signal;
means for separating the horizontal synchronizing signal from said separated composite synchronizing signal; and
means for forming said control signal from said detection signal and said separated horizontal synchronizing signal.

3. A detection system as claimed in claim 2 wherein said frequency dividing means comprises first and second ½ frequency dividers in cascade connection, and said detection signal producing means comprises an AND circuit supplied with the outputs of said first and second ½ frequency dividers.

4. A detection system as claimed in claim 2 wherein said means for forming the control signal comprises:

an AND circuit supplied with said detection signal and said separated horizontal synchronizing signal for deriving the horizontal synchronizing signal during the period of said detection signal, said horizontal synchronizing signal thus derived being a horizontal synchronizing signal located immediately before the initial point of the digital signal in said composite digital signal;

a frequency divider for subjecting said separated horizontal synchronizing signal to 1/n frequency division; and a flip-flop adapted to be set responsive to the output of said AND circuit and to be reset responsive to the output of said 1/n frequency divider to produce thereby said control signal as output.

5. A detection system as claimed in claim 1 whereby said means for generating the first pulse train comprises a first monostable multivibrator for generating said first pulse train having a pulse width of $\tau_1$ responsive to said separated composite synchronizing signal supplied thereto, and said means for generating the second pulse train comprises a second monostable multivibrator for generating said second pulse train having a pulse width of $\tau_2$ responsive to said separated composite synchronizing signal supplied thereto.

6. A detection system as claimed in claim 1 whereby said first pulse train generation means is included in said clock pulse generation means, and said frequency dividing means is supplied with said first pulse from said clock pulse generation means.

* * * * *